(12) United States Patent
Abe

(10) Patent No.: US 6,960,006 B2
(45) Date of Patent: Nov. 1, 2005

(54) VEHICLE HEADLAMP AND OPPOSITE HOLDING TYPE PIVOT MECHANISM FOR VEHICLE HEADLAMP

(75) Inventor: Toshiya Abe, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 10/383,237

(22) Filed: Mar. 7, 2003

(65) Prior Publication Data

US 2003/0223245 A1 Dec. 4, 2003

(30) Foreign Application Priority Data

Mar. 7, 2002 (JP) ........................................ 2002-062293

(51) Int. Cl.[7] .............................................. B60Q 1/00
(52) U.S. Cl. ..................... 362/538; 362/466; 362/523; 362/530
(58) Field of Search ................................ 362/465, 466, 362/514, 523, 525, 526, 530, 531, 532, 538, 539

(56) References Cited

U.S. PATENT DOCUMENTS

| | | | | |
|---|---|---|---|---|
| 5,343,371 A | * | 8/1994 | Kobayashi et al. ......... | 362/538 |
| 6,059,435 A | * | 5/2000 | Hamm et al. ............... | 362/514 |
| 6,186,651 B1 | * | 2/2001 | Sayers et al. ............... | 362/512 |
| 6,193,400 B1 | * | 2/2001 | Schuster et al. ............ | 362/538 |
| 6,309,094 B1 | * | 10/2001 | Woerner ..................... | 362/539 |
| 6,565,245 B2 | * | 5/2003 | Yokoi ......................... | 362/512 |
| 6,607,295 B2 | * | 8/2003 | Hayakawa .................. | 362/517 |

FOREIGN PATENT DOCUMENTS

| | | |
|---|---|---|
| FR | 2 760 069 A1 | 8/1998 |
| JP | 2002-231015 A | 8/2002 |
| JP | 2002-367410 A | 12/2002 |

* cited by examiner

Primary Examiner—John Anthony Ward
(74) Attorney, Agent, or Firm—Foley & Lardner LLP

(57) ABSTRACT

A vehicle headlamp has a projector-type lamp unit. The lamp unit has a lens holder. An external surface of the lens holder is formed in a convex circular-arc shape, centering on a rotation axis. As a result, even if the lamp unit rotates about the rotation axis, the clearance between the internal surface at the edge of an opening in an inner panel and the external surface of the lens holder is maintained substantially constant at all times.

20 Claims, 10 Drawing Sheets

VEHICLE HEADLAMP AND OPPOSITE HOLDING TYPE PIVOT MECHANISM FOR VEHICLE HEADLAMP

BACKGROUND OF THE INVENTION

1) Field of the Invention

The present invention relates to vehicle headlamps having a variable light distribution mechanism. More specifically, the present invention relates to vehicle headlamps in which a projector-type lamp unit can be rotated about an axis to change the direction of light irradiated by a lamp unit.

Further, the present invention relates to an opposite holding type pivot mechanism, in the vehicle headlamp having the variable light distribution mechanism, that pivotally supports the lamp unit on a frame by holding at opposite ends as well as rotatably about the rotation axis.

In the following description, "vertical direction" and "horizontal direction" indicate "vertical direction" and "horizontal direction" when the vehicle headlamp and the opposite holding type pivot mechanism for the vehicle headlamp of the present invention is mounted on a vehicle.

2) Description of the Related Art

A vehicle headlamp having a variable light distribution mechanism is disclosed, for example, in French Patent Publication (FR 2 760 069 A1). This vehicle headlamp comprises a lamp housing that is divided into a lamp chamber and a lamp lens. A projector-type lamp unit and a frame are arranged in the lamp chamber. The projector-type lamp unit is mounted on the frame via the variable light distribution mechanism and can rotate about an axis (hereinafter, "rotation axis"). The frame is mounted on the lamp housing via an light axis adjusting mechanism.

In this vehicle headlamp, the direction of light irradiated by the lamp unit is changed by rotating the projector-type lamp unit about the rotation axis via the variable light distribution mechanism. The rotation of the projector-type lamp unit is performed based on information about running condition (hereinafter "vehicle running state information"), road information, map information, position information, and the like. In this manner, the vehicle headlamp can ensure the safety by controlling the light distribution optimally corresponding to the road shape, running speed and the like. For example, the driver's field of vision and visibility at the time of nighttime driving can be improved, by changing the light irradiation direction towards the steering direction of the vehicle. Such a system is well known, and referred to as an adaptive front lighting system (AFS).

However, this vehicle headlamp has a problem in appearance, since the projector-type lamp unit in the lamp chamber, the frame, the variable light distribution mechanism, and the light axis adjusting mechanism can be seen through the lamp lens.

Vehicle headlamps that aim to solve the problem of appearance has been disclosed in, for example, Japanese Patent Application Laid-Open Nos. 2002-231015 and 2002-367410. The headlamp disclosed in Japanese Patent Application Laid-Open No. 2002-231015 has a configuration such that an extension (4) is arranged between a lamp unit and an outer lens (5), and a standing wall (6) is provided in a reflector (1) of the lamp unit. Because of the provision of the standing wall (6), the back of the reflector (1) is not seen through the outer lens (5) even if the reflector (1) rotates, and, as a result, the appearance becomes better.

The headlamp disclosed in Japanese Patent Application Laid-Open No. 2002-367410 has a configuration such that an inner panel (60) is arranged between a lamp unit and an outer lens (5), and dummy portions (13a) and (13b) are provided in a reflector (4) of the lamp unit. Because of the provision of the dummy portions (13a) and (13b), the field of vision in the depth direction on the back side of the reflector (4) through the outer lens (5) is blocked even if the reflector (4) is rotated, and, as a result, the appearance becomes better.

In these two headlamps, however, the lamp unit is not the projector-type lamp unit, but a lamp unit of a type that irradiates the reflected light from the reflector (1) or the reflector (4) to the outside. Therefore, it is difficult to directly apply the technique of the above two vehicle headlamps to the vehicle headlamp having a projector-type lamp unit. In other words, since the projector-type lamp unit has a projection lens (condenser lens such as convex lens)that projects the reflected light from the reflector, and a lens holder for supporting the projection lens, this projection lens and the lens holder rotate with a rotation of the lamp unit. Therefore, it is necessary to improve the appearance, without disturbing the rotation of the projector-type lamp unit.

In the vehicle headlamp having the variable light distribution mechanism, the lamp unit is pivotally supported on the frame rotatably about the rotation axis. Particularly, in the case of the opposite holding type pivot mechanism, since the lamp unit is pivotally supported on opposite sides, it is effective against vibrations of the vehicle. It is necessary to pivotally support the lamp unit on the frame easily and at a low price, via the opposite holding type pivot mechanism.

SUMMARY OF THE INVENTION

It is an object of the present invention to provide a vehicle headlamp having a better appearance.

The vehicle headlamp according to one aspect of the present invention comprises a projector-type lamp unit having a light source, a reflector that reflects light irradiated by the light source, a projection lens that projects light reflected by the reflector in a predetermined light radiation direction, and a lens holder fixed to the reflector for supporting the projection lens, wherein the projector-type lamp unit is capable of being rotated about a rotation axis so as to change the direction of the light irradiated from the projector-type lamp unit; and an inner panel with an opening. At least the projection lens of the lamp unit is exposed from the opening in the inner panel in the light irradiation direction, the rotation axis is located opposite to the projection lens, with the inner panel put therebetween, and an external surface exposed from the opening in the inner panel in the light irradiation direction with the rotation of the lamp unit, of the external surface of the lens holder, is formed in a convex circular-arc shape centering on the rotation axis.

The vehicle headlamp according to another aspect of the present invention comprises a projector-type lamp unit having a light source, a reflector that reflects light irradiated by the light source, a projection lens that projects reflected light from the reflector in a predetermined light irradiation direction, and a cylindrical lens holder fixed to the reflector for supporting the whole periphery of the projection lens, wherein the projector-type lamp unit is capable of being rotated about a rotation axis so as to change the direction of the light irradiated from the projector-type lamp unit; and an inner panel with an opening. A part of the projection lens and the lens holder of the lamp unit is exposed from the opening in the inner panel in the light irradiation direction, an external surface of the lens holder is formed in a convex circular-arc shape centering on the rotation axis, an internal surface at the edge of the opening in the inner panel is formed in a concave circular-arc shape having a slightly larger diameter than that of the external surface of the convex circular-arc shape of the lens holder, centering on the rotation axis, and the rotation axis is a single axle provided substantially vertically, on the side opposite to the projection lens, with the inner panel put therebetween, and is a rotation axis of an opposite holding type pivot mechanism that pivotally supports the lens holder in the lamp unit rotatably on the frame.

The vehicle headlamp according to still another aspect of the present invention comprises a projector-type lamp unit having a light source, a reflector that reflects light irradiated by the light source, a projection lens that projects reflected light from the reflector in a predetermined light irradiation direction, and a cylindrical lens holder fixed to the reflector for supporting the whole periphery of the projection lens wherein the projector-type lamp unit is capable of being rotated about a rotation axis so as to change the direction of the light irradiated from the projector-type lamp unit; and an inner panel with an opening. A part of the projection lens and the lens holder of the lamp unit is exposed from the opening in the inner panel in the light irradiation direction, an external surface of the lens holder is formed in a convex circular-arc shape centering on the rotation axis, an internal surface at the edge of the opening in the inner panel is formed in a concave circular-arc shape having a slightly larger diameter than that of the external surface of the convex circular-arc shape of the lens holder, centering on the rotation axis, and the rotation axis includes a first rotation axis provided substantially vertically on the side opposite to the projection lens, with the inner panel put therebetween, and a second rotation axis provided substantially horizontally, intersecting each other, and comprises the first rotation axis that is a rotation axis of an opposite holding type pivot mechanism that pivotally supports the lens holder in the lamp unit rotatably on the frame, and the second rotation axis that is a rotation axis of an light axis adjusting mechanism that pivotally supports the frame rotatably on the lamp housing.

The opposite holding type pivot mechanism, for a vehicle headlamp, that pivotally supports a lamp unit of the vehicle headlamp on a frame on opposite sides rotatably about a rotation axis, according to still another aspect of the present invention comprises a first pivot that pivotally supports the lamp unit on the frame by one of opposite holding parts rotatably about the rotation axis and a first rotation shaft; and a second pivot that pivotally supports the lamp unit on the frame by the other of the opposite holding parts rotatably about the rotation axis, a second rotation shaft, and an intermediate member. The first pivot, the first rotation shaft, the second pivot, and the second rotation shaft are provided on the lens holder and the frame, the first pivot is provided with a hole in which the first rotation shaft is mounted rotatably in the direction of the rotation axis, the second pivot is provided with an opening in which the second rotation shaft is inserted in a direction transverse to the rotation axis, and the intermediate member is press fit and secured in the direction of the rotation axis, and the intermediate member is provided with a hole in which the second rotation shaft is mounted rotatably in the direction of the rotation axis.

The opposite holding type pivot mechanism, for a vehicle headlamp, that pivotally supports a lamp unit of the vehicle headlamp on a metal frame on opposite sides rotatably about a rotation axis, wherein the lamp unit is a projector-type lamp unit and includes a light source; a reflector that reflects light from the light source; a projection lens that projects reflected light from the reflector in a predetermined light irradiation direction; and a metal lens holder fixed to the reflector for supporting the projection lens, according to still another aspect of the present invention comprises a first pivot made of metal and that pivotally supports the lens holder on the frame by one of opposite holding parts rotatably about the rotation axis, a first rotation shaft made of metal, and a first bearing made of metal; and a second pivot made of metal and that pivotally supports the lens holder on the frame by the other of the opposite holding parts rotatably about the rotation axis, a second rotation shaft made of metal, a second bearing made of metal, and an intermediate member made of metal. The first pivot, the first rotation shaft, the second pivot, and the second rotation shaft are provided on the lens holder and the frame, the first pivot is provided with a hole in which the first rotation shaft is mounted rotatably in the direction of the rotation axis via the first bearing. The second pivot is provided with an opening in which the second rotation shaft is inserted in a direction transverse to the rotation axis and the intermediate member is press fit and secured in the direction of the rotation axis. The intermediate member is provided with a hole in which the second rotation shaft is mounted rotatably in the direction of the rotation axis via the second bearing. Each of the second pivot and the intermediate member are provided with a detent unit, which prevents the intermediate member from rotating about the rotation axis, the detent units having a wedge structure, and the rotation axis is positioned on a line connecting the detent units. The second pivot is provided with a spring that energizes the lamp unit in the press fit direction of the intermediate member at all times. The second pivot and the spring are provided with a positioning unit. The rotation axis is provided substantially vertically, and the first pivot and the first rotation shaft are provided on the lower side of the opposite holding parts, of the lamp unit and the frame.

These and other objects, features and advantages of the present invention are specifically set forth in or will become apparent from the following detailed descriptions of the invention when read in conjunction with the accompanying drawings.

DETAILED DESCRIPTION

Figure 1:
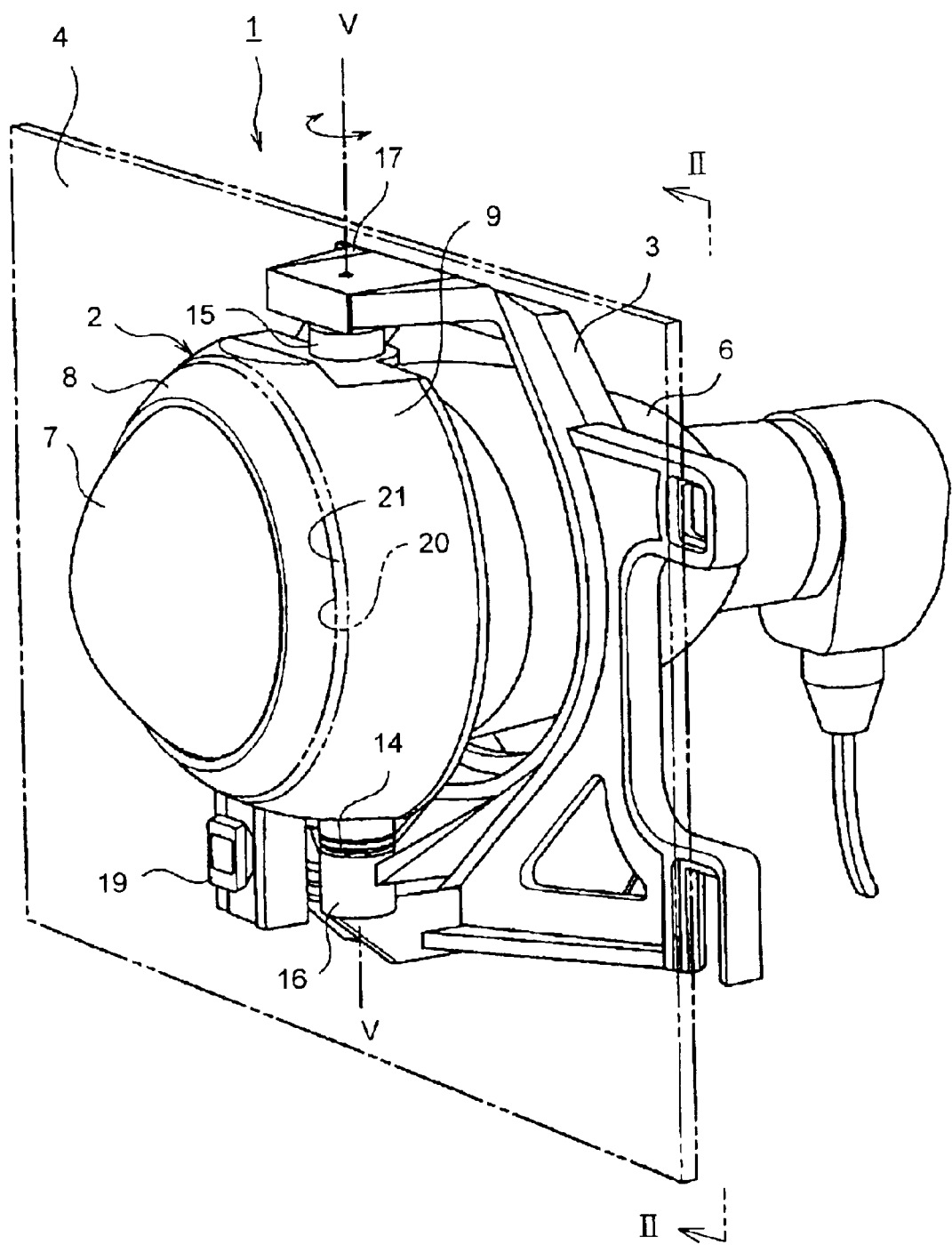
FIG. 1 is a perspective view of a main part that shows a first embodiment of a vehicle headlamp of the present invention.
Figure 2:
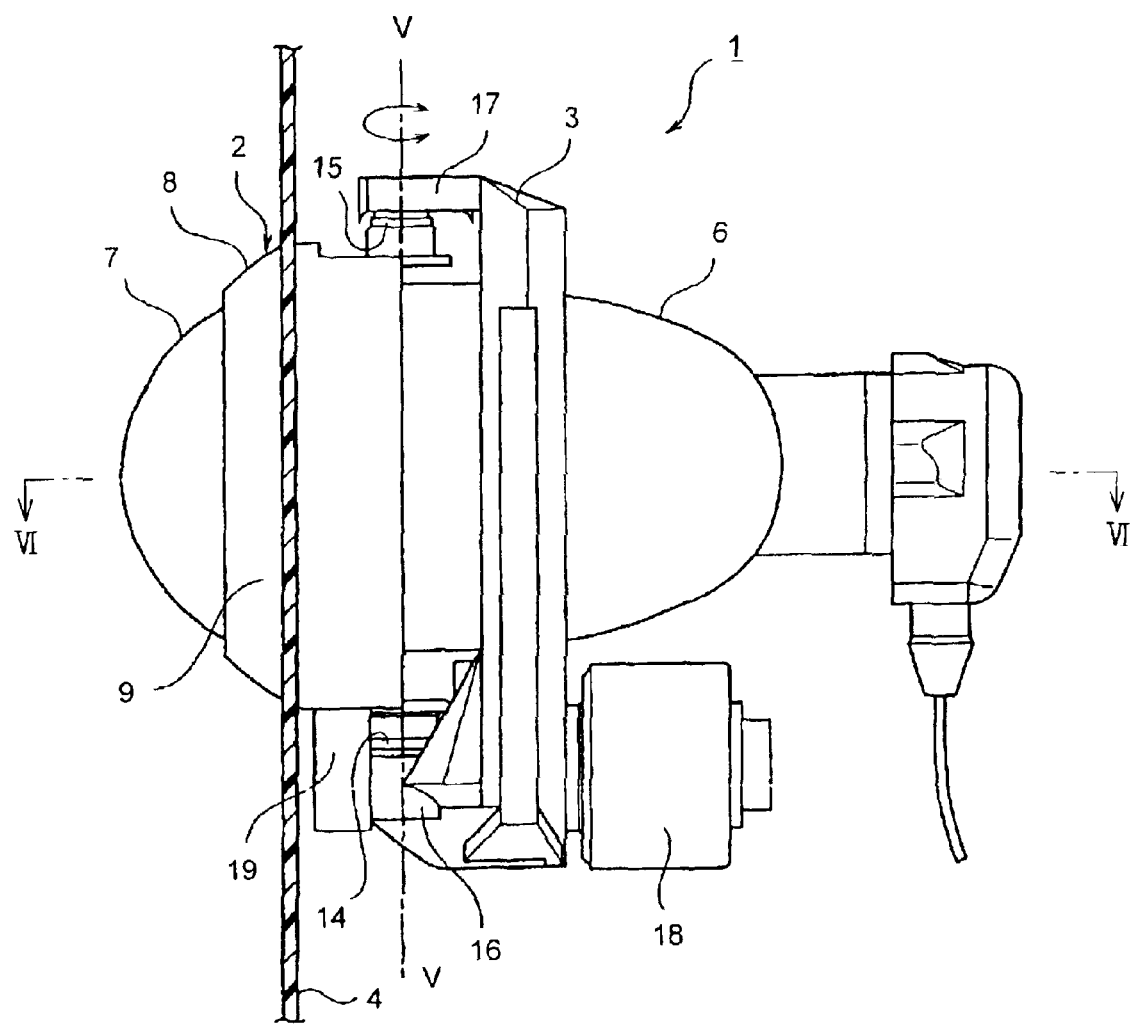
FIG. 2 is a sectional view along the line II—II in FIG. 1.

Exemplary embodiments of the vehicle headlamp and the opposite holding type pivot mechanism according to the present invention will be explained below with reference to the accompanying drawings. However, the present invention is not limited by those embodiments.

FIG. 1 to FIG. 6 show a first embodiment of the vehicle headlamp according to the present invention.

In those figures, reference numeral 1 denotes the vehicle headlamp according to the first embodiment. The vehicle headlamp 1 comprises a lamp housing (not shown) for dividing a lamp chamber (not shown) and a lamp lens or an outer lens (not shown), a projector-type lamp unit 2 (hereinafter simply referred to as a lamp unit 2) arranged in the lamp chamber, a metal frame 3, and an inner panel 4. The lamp unit 2 is pivotally supported on the frame 3 rotatably about a vertical axis V—V that is a rotation axis, (hereinafter simply referred to as a vertical axis V—V), via an opposite holding type pivot mechanism (described later). The frame 3 and the inner panel 4 are equipped in the lamp housing.

Figure 3:
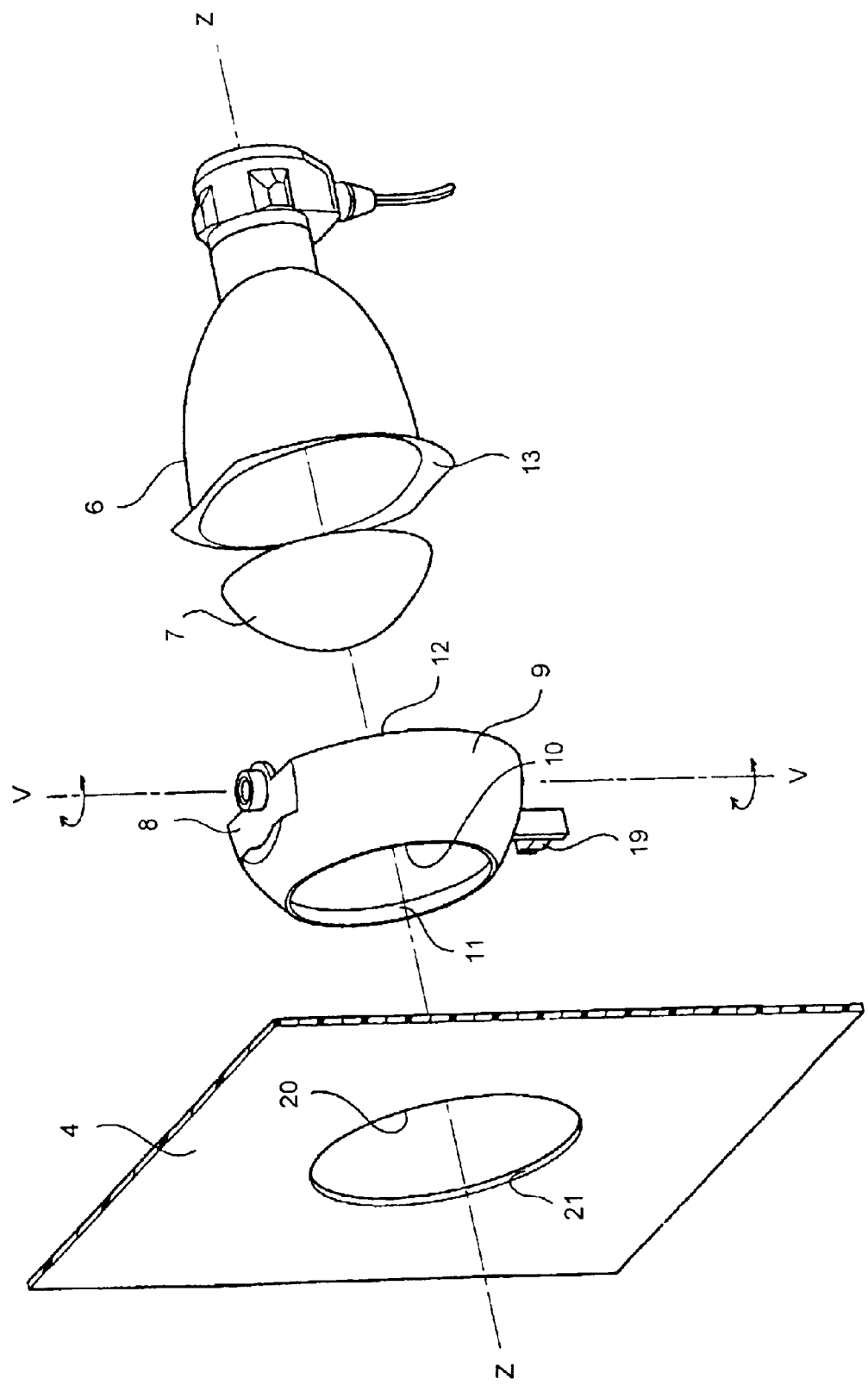
FIG. 3 is an exploded perspective view that shows a projector-type lamp unit and an inner panel.
Figure 4:
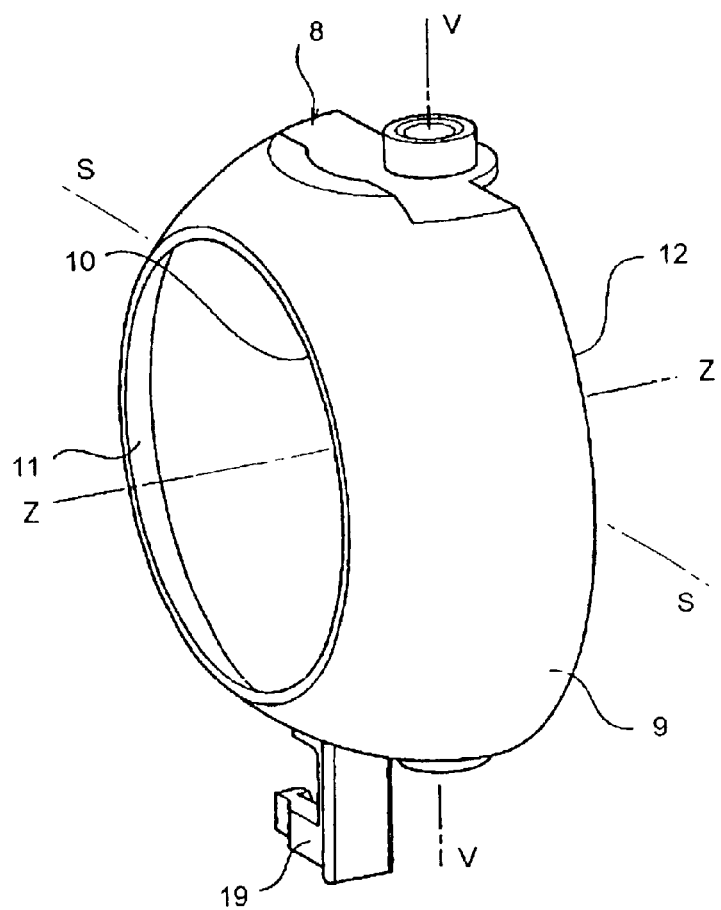
FIG. 4 is a perspective view that shows a lens holder.
Figure 6:
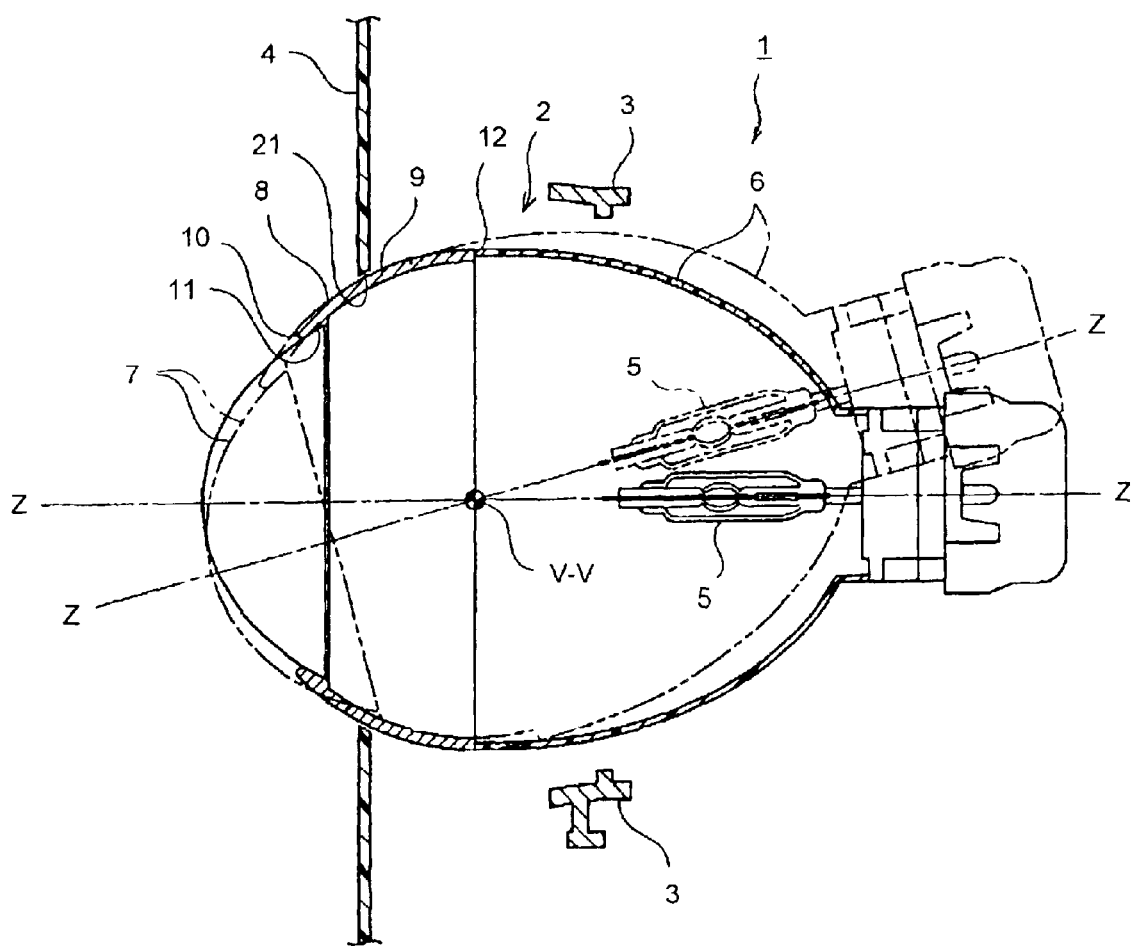
FIG. 6 is a sectional view along the line VI—VI in FIG. 2.

The lamp unit 2 comprises, as shown in FIG. 3 and FIG. 6, a light source 5, a reflector 6 for reflecting the light from the light source 5, a projection lens (for example, a condenser lens such as a convex lens) 7 for projecting the reflected light from the reflector 6 in a predetermined light irradiation direction (a direction indicated by an arrow in FIG. 6, and a forward direction along the light axis Z—Z), and a lens holder 8 fixed to the reflector 6 for supporting the projection lens 7.

The lens holder 8 forms a cylindrical shape made of metal. An annular fitting section 11 is provided on the inner periphery of an opening at one end (front opening) of the lens holder 8. This fitting section 11 supports the whole periphery of the projection lens 7. An opening at the other end (rear opening) 12 of the lens holder 8 is fixed to a flange 13 at an opening of the reflector 6.

A first rotation shaft 14 and a second rotation shaft 15 are provided on the same axis, on the lower side and the upper side of the lens holder 8. On the other hand, a first pivot section 16 and a second pivot section 17 are provided on the same axis, at the bottom end and at the upper end of the frame 3. The first rotation shaft 14 and the second rotation shaft 15 are rotatably mounted to the first pivot section 16 and the second pivot section 17, thereby the lamp unit 2 is pivotally supported on the frame 3 rotatably about the vertical axis V—V via the opposite holding type pivot mechanism. The opposite holding type pivot mechanism comprises the first rotation shaft 14, the second rotation shaft 15, the first pivot section 16, and the second pivot section 17. The vertical axis V—V of the opposite holding type pivot mechanism is located opposite to the projection lens 7, with the inner panel 4 put therebetween, that is, on the backside of the inner panel 4.

A driver 18 is fixed to the frame 3. The driver 18 comprises an actuator such as a stepping motor, a normal motor, a solenoid, or a cylinder, and is formed so as to drive by the AFS system. On the other hand, the lens holder 8 is provided with a reciprocating rod receiving member 19. A reciprocating rod (not shown) of the driver 18 is connected to the reciprocating rod receiving member 19. As a result, the lamp unit 2 rotates about the vertical axis V—V with respect to the frame 3, by driving the driver 18 so that the reciprocating rod advances or retreats.

The inner panel 4 is provided with an opening 20. A part of the projection lens 7 of the lamp unit 2 and the lens holder 8 are exposed from the opening 20 of the inner panel in the light irradiation direction. This inner panel 4 is for concealing parts located on the backside of the inner panel 4 (on the side opposite to the side where a part of the projection lens 7 and the lens holder 8 is exposed from the opening 20 of the inner panel in the light irradiation direction). Therefore, since the parts in the lamp chamber cannot be seen through the lamp lens, there is no problem in the appearance. The parts include the opposite holding type pivot mechanism (the first rotation shaft 14, the second rotation shaft 15, the first pivot section 16, and the second pivot section 17), the driver 18, the reciprocating rod receiving member 19, and a power code (not shown).

Figure 5:
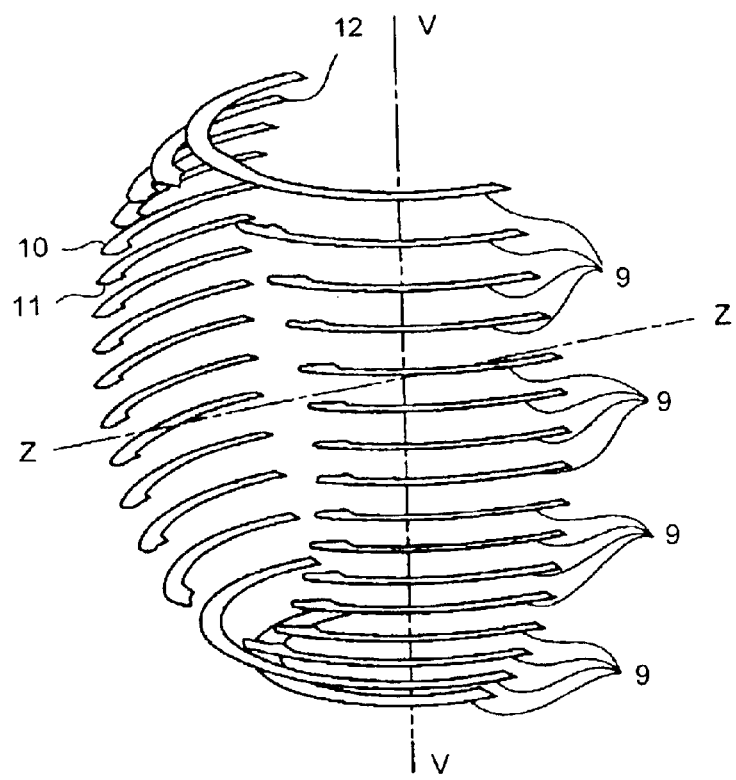
FIG. 5 is a sectional view along the line S—S in FIG. 4, that is a sectional view that shows a section obtained by cutting the lens holder shown in FIG. 4 into 16 vertically, along a direction orthogonal to the rotation axis (Z—Z)

Of the external surface of the lens holder 8, the external surface 9 in the whole area from an opening 10 at one side to an opening 12 at the other side, excluding the lower part and the upper part, is formed in a convex circular-arc shape, centering on the vertical axis V—V. In other words, as shown in FIG. 5, the peripheral line in cross section orthogonal to the vertical axis V—V of the lens holder 8 forms a circular arc centering on the vertical axis V—V. Therefore, if the lamp unit 2 is rotated in the horizontal direction (lateral direction) about the vertical axis V—V, as shown by a solid line and a chain double-dashed line in FIG. 6, the external surface of the lens holder 8 agrees with the circular orbit centering on the vertical axis V—V. FIG. 5 is a sectional view that shows a section obtained by cutting the lens holder 8 shown in FIG. 4 into 16 vertically, along a direction orthogonal to the vertical axis V—V (S—S direction in FIG. 4).

The inner surface 21 at the edge of the opening 20 of the inner panel 4 is formed in a concave circular-arc shape having a slightly larger diameter than that of the convex circular-arc external surface 9 of the lens holder 8, centering on the vertical axis V—V. As a result, the external surface 9 of the lens holder 8 can be brought close to the inner surface 21 at the edge of the opening 20 of the inner panel 4, substantially without a clearance. Further, the clearance (distance) between the inner surface 21 at the edge of the opening 20 of the inner panel 4 and the external surface 9 of the lens holder 8 can be made substantially constant, over the whole circumference of the opening 20 of the inner panel 4.

The vehicle headlamp 1 according to the first embodiment has the above-described configuration, and the action and the effect thereof is explained below. That is, in the vehicle headlamp 1 according to the first embodiment, since the parts such as the rotation shaft of the lamp unit 2 located at the back of the inner panel 4 cannot be seen, there is no problem in the appearance. Particularly, in the vehicle headlamp 1 according to the first embodiment, since the external surface 9 of the lens holder 8 is formed in a convex circular-arc shape centering on the vertical axis V—V, even when the lamp unit 2 is rotated about the vertical axis V—V, the clearance between the inner surface 21 at the edge of the opening 20 of the inner panel 4 and the external surface 9 of the lens holder 8 is kept substantially constant. As a result, the vehicle headlamp 1 according to the first embodiment can improve the appearance, without disturbing the rotation of the projector-type lamp unit 2.

In the vehicle headlamp 1 according to the first embodiment, the external surface 9 of the lens holder 8 is formed in a convex circular-arc shape centering on the vertical axis V—V, and on the other hand, the inner surface 21 at the edge of the opening 20 of the inner panel 4 is formed in a concave circular-arc shape having a slightly larger diameter than that of the convex circular-arc external surface 9 of the lens holder 8, centering on the vertical axis V—V. Therefore, in the vehicle headlamp 1 according to the first embodiment, the external surface 9 of the lens holder 8 can be brought close to the inner surface 21 at the edge of the opening 20 of the inner panel 4, substantially without a clearance. As a result, in the vehicle headlamp 1 according to the first embodiment, the parts at the backside of the inner panel 4 cannot be seen substantially completely, without providing a large flange in the lens holder 8, and the appearance can be further improved. Further, the clearance (distance) between the inner surface 21 at the edge of the opening 20 of the inner panel 4 and the external surface 9 of the lens holder 8 can be made substantially constant, over the whole circumference of the opening 20 of the inner panel 4, by the convex circular-arc external surface 9 and the concave circular-arc inner surface 21. As a result, the vehicle headlamp 1 according to the first embodiment can further improve the appearance.

In the vehicle headlamp 1 according to the first embodiment, the first rotation shaft 14 and the second rotation shaft 15, of the opposite holding type pivot mechanism, forming the rotation axis (vertical axis V—V) of the lamp unit 2, are provided in the lens holder 8. Therefore, in the vehicle headlamp 1 according to the first embodiment, at the time of assembly of the lamp unit 2, the center of the circular arc on the convex circular-arc external surface 9 does not come off from the rotation axis (vertical axis V—V), and hence the appearance can be improved, without disturbing the rotation of the projector-type lamp unit 2.

In the vehicle headlamp 1 according to the first embodiment, since the lamp unit 2 is pivotally supported on the frame 3 by the opposite holding type pivot mechanism (the first rotation shaft 14, the second rotation shaft 15, the first pivot section 16, and the second pivot section 17), the lamp unit 2 can be effectively and reliably protected from vibrations of the vehicle.

In the vehicle headlamp 1 according to the first embodiment, since the external surface 9 of the lens holder 8 is formed in a convex circular-arc shape over the whole area of from the opening 10 at one end to the opening 12 at the other end, there is an advantage in that the design value is high, and the moldability is excellent.

Figure 7:
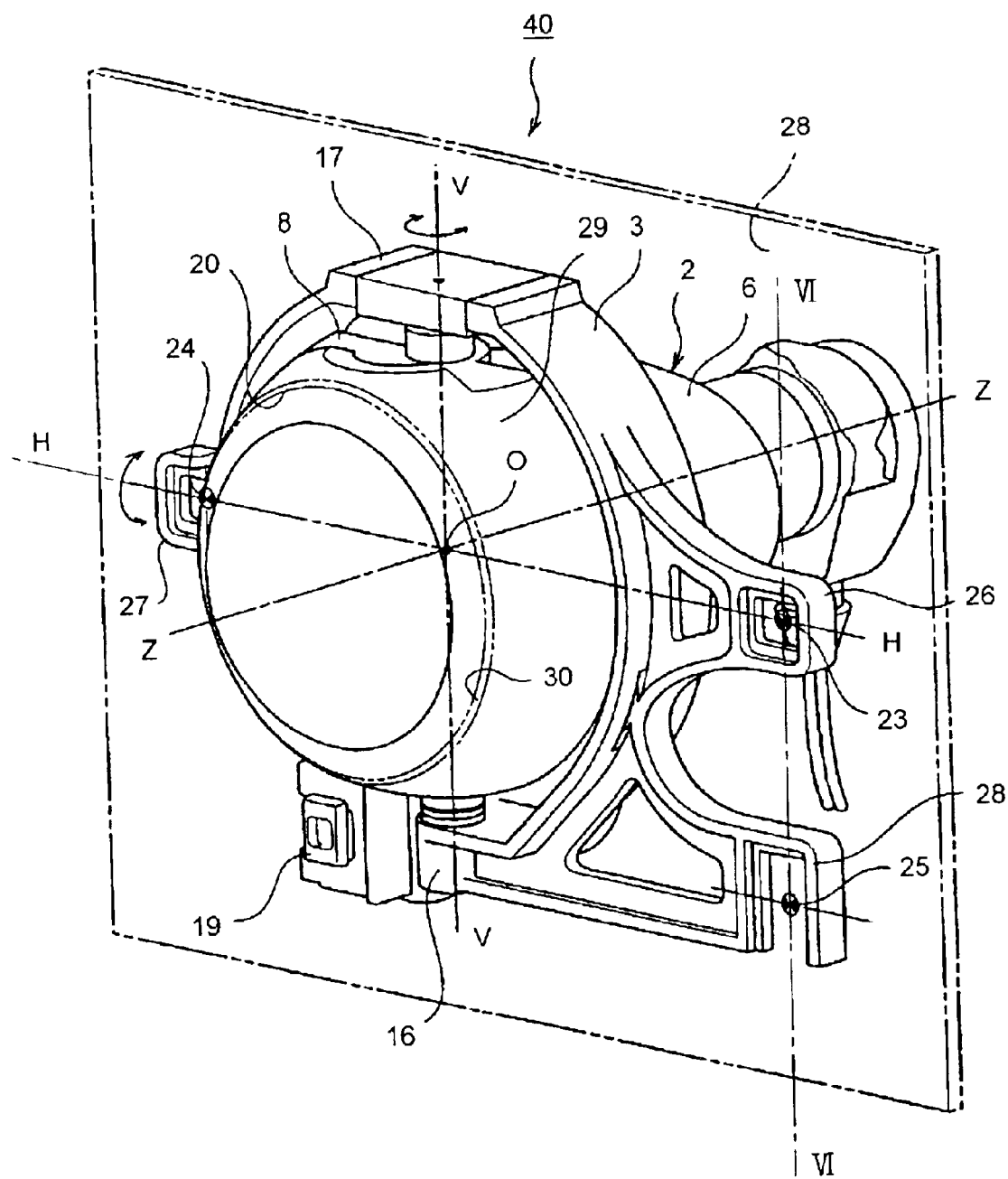
FIG. 7 is a perspective view of a main part that shows a second embodiment of the vehicle headlamp of the present invention.
Figure 8:
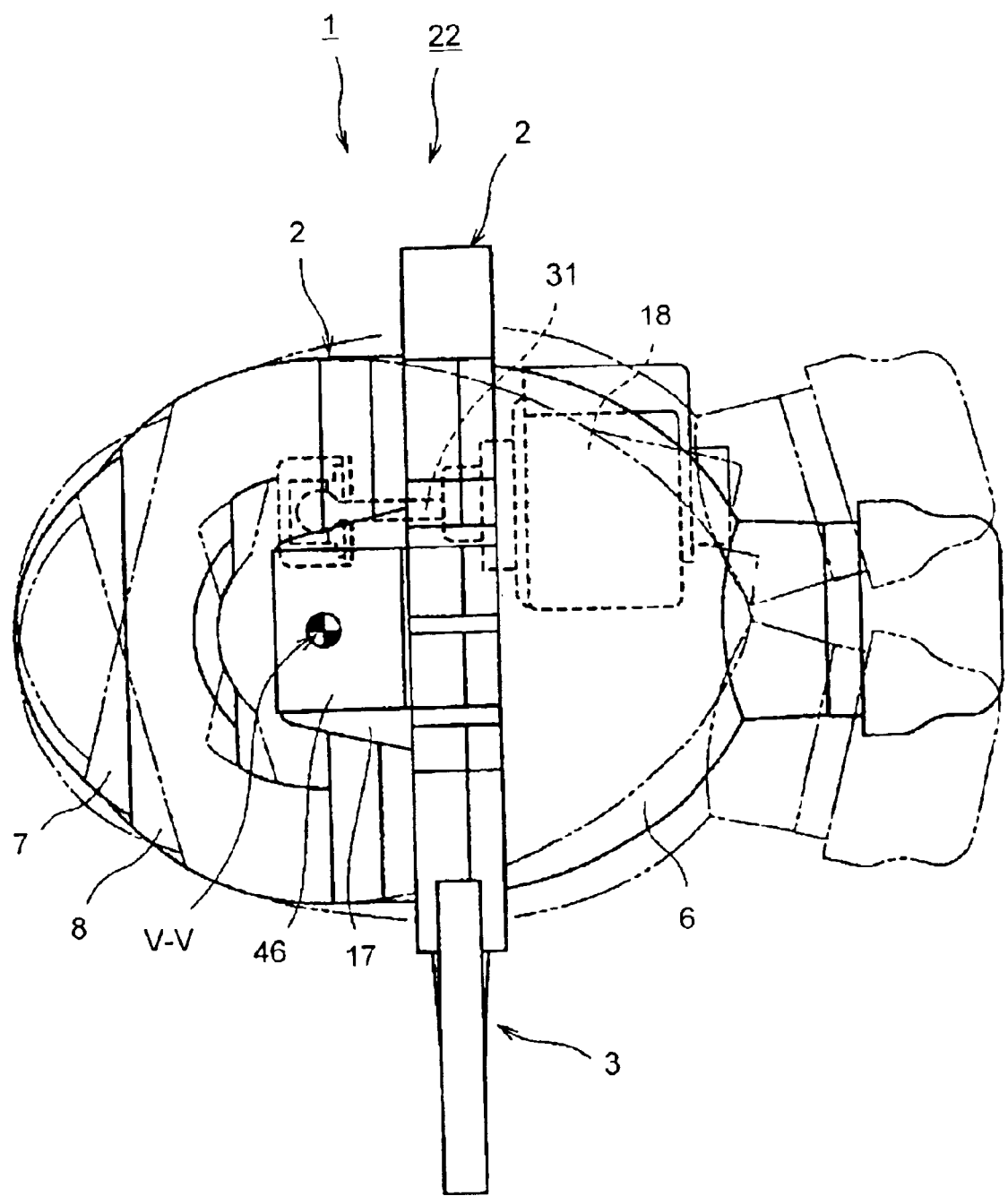
FIG. 8 is a plan view of a main part that shows an embodiment of an opposite holding type pivot mechanism for the vehicle headlamp of the present invention.

FIG. 7 shows a second embodiment of the vehicle headlamp of the present invention. In the figure, the same reference numeral as in FIG. 1 to FIG. 6 shows the same part.

In this figure, reference numeral 22 denotes a vehicle headlamp according to the second embodiment. The vehicle headlamp 22 has an light axis adjusting mechanism that performs light axis adjustment of the lamp unit 2. This light axis adjusting mechanism is for pivotally supporting the frame 3 that pivotally supports the projector-type lamp unit 2 on opposite sides, on the lamp housing rotatably in the vertical direction about the horizontal axis H—H for light axis adjustment, and in the lateral direction about the vertical axis V1—V1 for light axis adjustment. At the time of assembling the vehicle headlamp 22 on the car body, the light axis of the lamp unit 2 (the light irradiation direction Z—Z) can be finely adjusted in the vertical and lateral directions.

The light axis adjusting mechanism comprises a ball joint (not shown) constituting a rotation fulcrum 23, a lateral light axis adjusting unit (not shown) constituting a lateral movement fulcrum 24, and a vertical light axis adjusting unit (not shown) constituting a vertical movement fulcrum 25. The ball joint comprises a rod (not shown) fixed in the lamp housing and having a spherical pivot at the end, and a pivot receiving member (not shown) fitted and secured in a first bracket portion 26 of the frame 3 for mounting the spherical pivot. On the other hand, the two lateral and vertical light axis adjusting units both comprise an aiming screw (not shown) rotatably supported on the lamp housing, and a nut member (not shown) fitted and secured in a second bracket portion 27 and a third bracket portion 28 in the frame 3 and screwed together with the aiming screw.

When the aiming screw in the lateral direction is rotated, the lamp unit 2 and the frame 3 rotate laterally about the vertical axis V1—V1 for the light axis adjustment connecting the rotation fulcrum 23 and the vertical movement fulcrum 25. When the aiming screw in the vertical direction is rotated, the lamp unit 2 and the frame 3 rotate vertically about the horizontal axis H—H for the light axis adjustment, connecting the rotation fulcrum 23 and the lateral movement fulcrum 24. As a result, the light axis of the lamp unit 2 (the light irradiation direction Z—Z) can be finely adjusted vertically and laterally, at the time of assembling the vehicle headlamp 22 on the car body.

The vehicle headlamp 22 is constructed such that the vertical aiming screw can be rotated by the driver (not shown) driven by the AFS system, similar to the driver 18 in the first embodiment. As a result, there are two rotation axes in the vehicle headlamp 22, that is, the vertical axis V—V and the horizontal axis H—H, orthogonal to each other. In other words, there are the vertical axis V—V (first rotation axis) that is a rotation axis of the opposite holding type pivot mechanism that pivotally supports the lens holder 8 in the lamp unit 2 rotatably on the frame 3, explained in the first embodiment, and the horizontal axis H—H (second rotation axis) that is a rotation axis of the light axis adjusting mechanism for the vertical direction that pivotally supports the frame 3 on the lamp housing rotatably in the vertical direction. By this configuration, the lamp unit 2 can be rotated about the vertical axis V—V, as in the first embodiment, and can be also rotated about the horizontal axis H—H. As a result, the vehicle headlamp 22 can freely change the light irradiation direction (the light axis Z—Z) of the lamp unit 2 in every possible vertical and lateral directions, corresponding to the running environment and running condition of the vehicle.

In the vehicle headlamp 22, the external surface 29 of the lens holder 8 is formed in a spherical convex surface, centering on an intersection O of the vertical axis V—V and the horizontal axis H—H. In other words, the external surface 29 of the lens holder 8 is formed such that the peripheral line in cross section orthogonal to the vertical axis V—V as one rotation axis (first rotation axis) forms a circular arc centering on the vertical axis V—V, as in the first embodiment, and the peripheral line in cross section orthogonal to the horizontal axis H—H as the other rotation axis (second rotation axis) forms a circular arc centering on the horizontal axis H—H. The inner surface 30 at the edge of the opening 20 of the inner panel 4 is formed in a spherical concave surface having a slightly larger diameter than that of the external surface 29 of the convex circular-arc lens holder 8, centering on the intersection O of the vertical axis V—V and the horizontal axis H—H. As a result, with the vehicle headlamp 22, even when the lamp unit 2 is rotated in any direction vertically or laterally, the distance of the clearance between the external surface 29 of the lens holder 8 and the inner surface 30 at the edge of the opening 20 of the inner panel 4 becomes always constant. As a result, the vehicle headlamp 22 in the second embodiment can achieve the action and effect substantially similar to those of the vehicle headlamp 1 in the first embodiment.

In the first and second embodiments, the external surface 9, 29 of the lens holder 8 is formed in the convex circular-arc shape and in the spherical convex surface, respectively, over the whole area of from the opening 10 at one end to the opening 12 at the other end. In the present invention, however, only the external surface 9, 29 exposed from the opening 20 of the inner panel 4 in the light irradiation direction with the rotation of the lamp unit 2, of the external surface 9, 29 of the lens holder 8, may be formed in the convex circular arc shape and in the spherical convex surface.

In the first and second embodiments, a part of the projection lens 7 of the lamp unit 2 and the lens holder 8 is exposed from the opening 20 of the inner panel 4 in the light irradiation direction. In the present invention, however, only the projection lens 7 of the lamp unit 2 may be exposed from the opening 20 of the inner panel 4 in the light irradiation direction.

In the first and second embodiments, the opposite holding type pivot mechanism is provided in the lens holder 8 of the lamp unit 2, but in the present invention, the opposite holding type pivot mechanism may be provided in a portion other than the lens holder 8 of the lamp unit 2.

In the first and second embodiments, the inner panel 4 has a flat shape, but in the present invention, the inner panel may have various shapes other than the flat shape, corresponding to the shape of the lamp chamber.

In the first and second embodiments, the lens holder 8 has such a structure that the portion of the convex circular-arc external surface 9 or the spherical convex external surface 29, and the portion of the bottom end and the top end where the opposite holding type pivot mechanism (the first rotation shaft 14, the second rotation shaft 15) is provided form an integral structure. In the present invention, however, the lens holder 8 may have such a structure that the portion of the convex circular-arc external surface 9 or the spherical convex external surface 29, and the portion of the bottom end and the top end where the opposite holding type pivot mechanism (the first rotation shaft 14, the second rotation shaft 15) is provided form a separate structure.

In the first and second embodiments, a lamp unit of a type that irradiates the reflected light from the reflector or the reflector to the outside may be arranged in the lamp chamber, together with the projector-type lamp unit.

FIG. 8 to FIG. 11 show an embodiment of the opposite holding type pivot mechanism for the vehicle headlamp according to the present invention. In those figures, the same reference numeral as in FIG. 1 to FIG. 7 shows the same part.

The projector-type lamp unit 2 in the vehicle headlamp 1, 22 is pivotally supported on the upper and lower parts of the metal frame 3 via the lens holder 8, rotatably about the vertical axis V—V (rotation axis) in a state held on opposite ends by the opposite holding type pivot mechanism according to this embodiment. This lamp unit 2 rotates about the vertical axis V—V, with the advance or retreat of the reciprocating rod 31 in the driver 18.

The opposite holding type pivot mechanism in this embodiment comprises a first metal rotation axis 14, a second metal rotation axis 15, a first metal pivot section 16, a second metal pivot section 17, a first metal bearing 32, a second metal bearing 33, and a metal intermediate member 34 (a press fit member 34). The first pivot section 16, the first rotation shaft 14, and the first bearing 32 pivotally support the lamp unit 2 on the lower part of the frame 3 rotatably about the vertical axis V—V, by one of the opposite holding parts, via the lower part of the lens holder 8. The second pivot section 17, the second rotation shaft 15, the second bearing 33, and the intermediate member 34 pivotally support the lamp unit 2 on the upper part of the frame 3 by the other of the opposite holding parts, rotatably about the vertical axis V—V, via the upper part of the lens holder 8.

Figure 9:
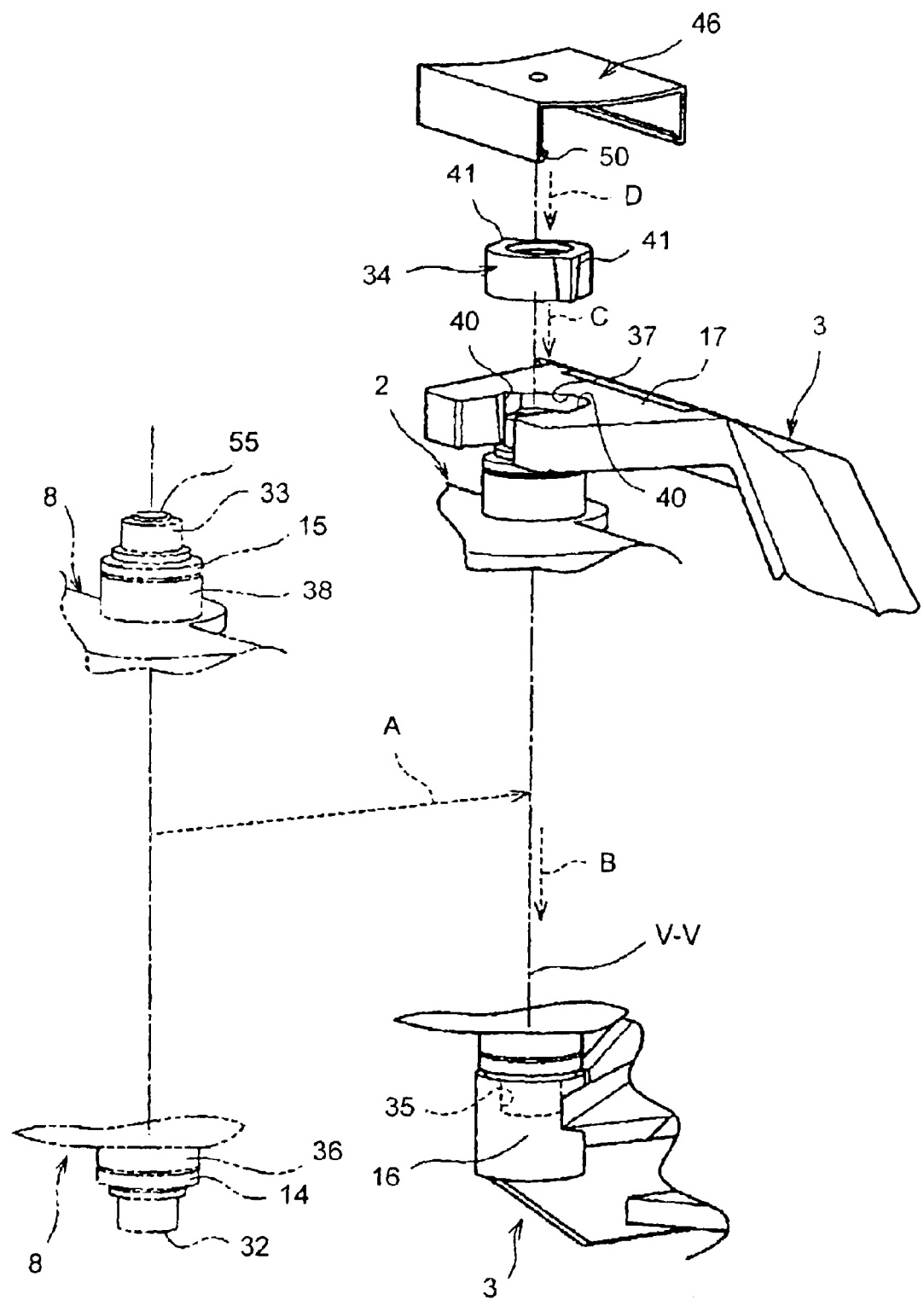
FIG. 9 shows the process of attaching a lamp unit to a frame.
Figure 10:
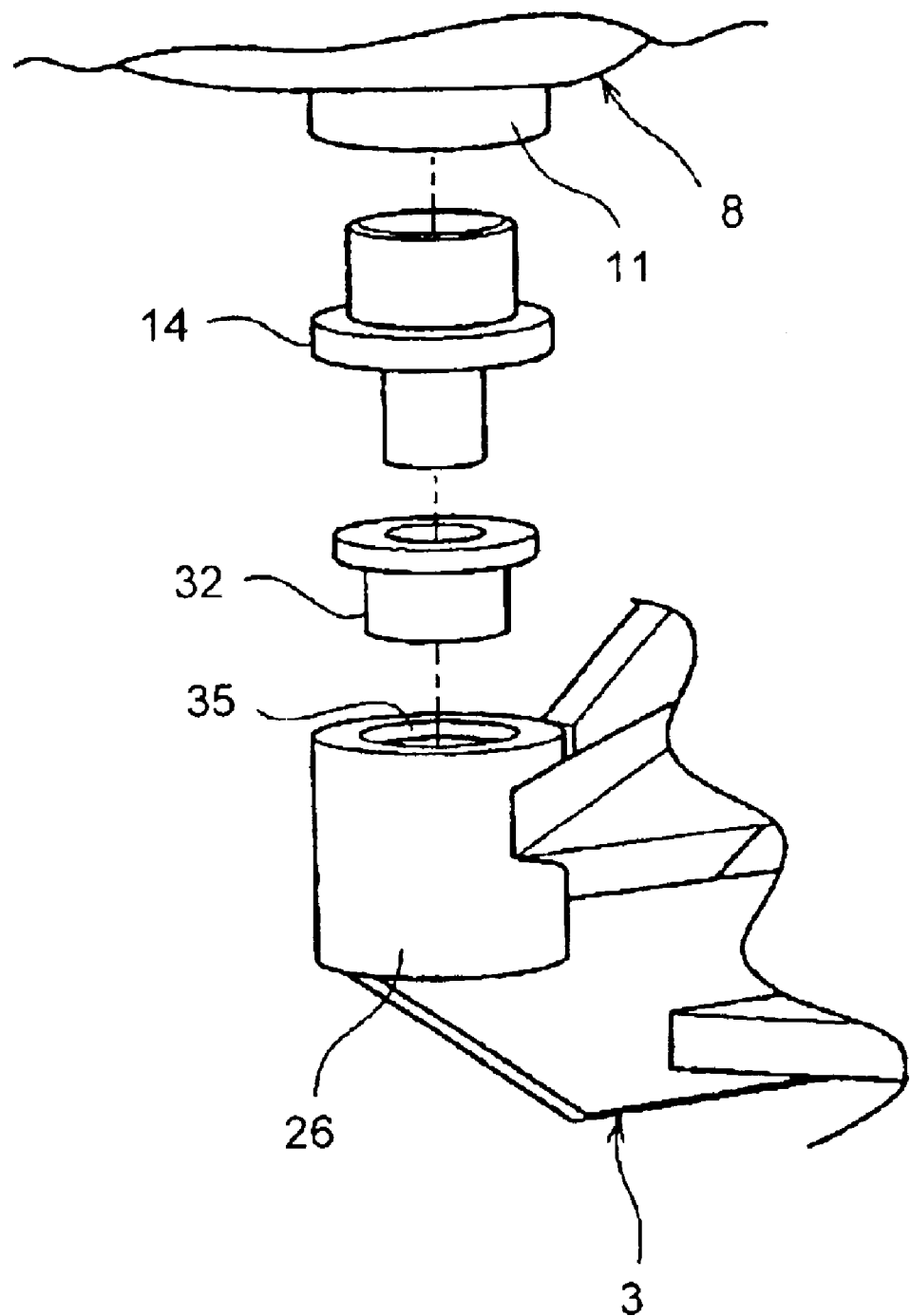
FIG. 10 is an exploded perspective view that shows the vicinity of a first pivot section and a first rotation shaft.

As shown in FIG. 9 and FIG. 10, the first pivot section 16 is integrally provided on the lower part of the frame 3. A hole 35 is provided in the first pivot section 16 in the direction of vertical axis V—V. This hole 35 is formed in a circular shape, so that the first rotation shaft 14 is mounted rotatably in the direction of vertical axis V—V via the first bearing 32. The inner diameter of the hole 35 and the outer diameter of an outer race of the first bearing 32 substantially agree with each other. A first cylindrical part 36 is integrally provided on the bottom part of the lens holder 8. The upper end of the first rotation shaft 14 is press fit in the first cylindrical part 36. An inner race of the first bearing 32 is press fit and secured at the bottom part of the first rotation shaft 14.

Figure 11:
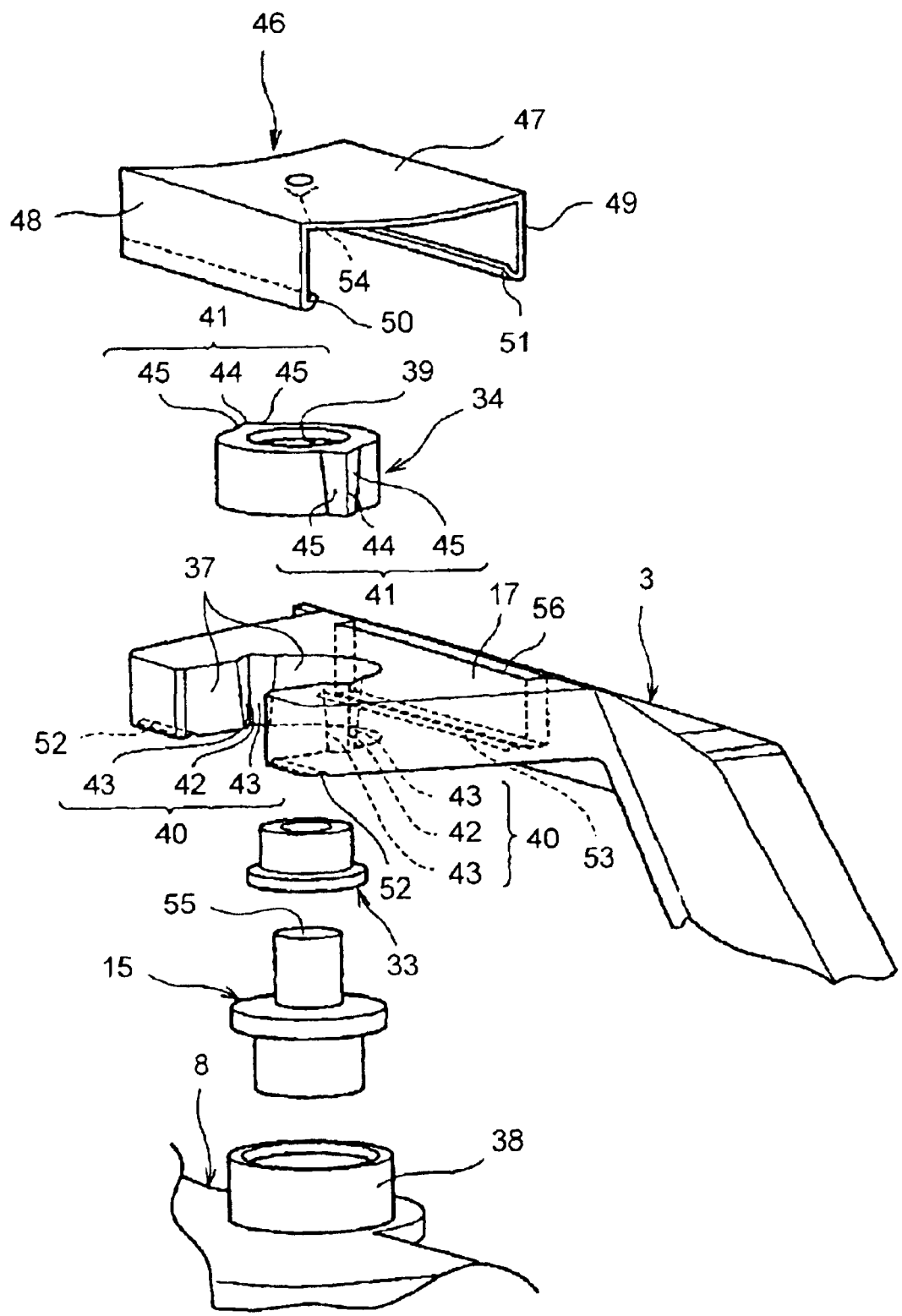
FIG. 11 is an exploded perspective view that shows the vicinity of a second pivot, a second rotation shaft, and an intermediate member.

As shown in FIG. 9 and FIG. 11, the second pivot section 17 is provided integrally on the upper part of the frame 3. An opening 37 is provided in the second pivot section 17. The opening 37 is formed in a U shape comprising an inlet portion into which the second rotation shaft 15 is inserted in a direction transverse to the vertical axis V—V, and a circular section in which the intermediate member 34 is press fit and secured in the direction of vertical axis V—V. The inlet portion and the inner diameter of the circular section of the opening 37 are larger than the outer diameter of the outer race of the second bearing 33. Further, the inner diameter of the circular section of the opening 37 and the outer diameter of the intermediate member 34 substantially agree with each other. The second cylindrical portion 38 is integrally provided on the lens holder 8. The bottom part of the second rotation shaft 15 is press fit and secured in the second cylindrical portion 38. The inner race of the second bearing 33 is press fit and secured on the upper end of the second rotation shaft 15.

As shown in FIG. 9 and FIG. 11, a hole 39 is provided in the intermediate member 34 in the direction of vertical axis V—V. This hole 39 is formed in a circular shape, so that the second rotation shaft 15 is mounted rotatably in the direction of vertical axis V—V via the second bearing 33. The inner diameter of the hole 39 and the outer diameter of the outer race of the second bearing 33 substantially agree with each other.

A pair of concave portion 40 and convex portion 41, engaging with each other, is provided respectively on the internal surface of the opening 37 in the second pivot section 17 and on the external surface of the intermediate member 34. The pair of concave portion 40 and convex portion 41 is a detent unit that prevents the intermediate member 34 from rotating about the vertical axis V—V due to the influence of the rotation force of the second rotation shaft 15. The pair of concave portion 40 and convex portion 41 of the detent unit forms a wedge structure. In other words, the concave portion 40 is formed in a wedge shape comprising an inclined trough line 42 that inclines towards the press fit direction of the intermediate member 34 (in the direction of arrow C in FIG. 9) so that the diameter thereof gradually decreases, and inclined planes 43 provided on the both sides of the inclined trough line 42. On the other hand, the convex portion 41 is formed in a wedge shape comprising an inclined ridge line 44 that inclines towards the press fit direction of the intermediate member 34 (in the direction of arrow C in FIG. 9) so that the diameter thereof gradually decreases, and inclined planes 45 provided on the both sides of the inclined ridge line 44. By the wedge action of the concave portion 40 and the convex portion 41 constituting the detent unit, the intermediate member 34 can be reliably fixed in the opening 37 in the second pivot section 17, without using a screw and without play, and high assembly accuracy can be achieved. The pair of concave portion 40 and convex portion 41 is arranged opposite to each other, so that the vertical axis V—V is located on a line connecting the pair of inclined trough lines 42 and a line connecting the pair of inclined ridge lines 44. As a result, the center of the axis of the intermediate member 34 and the center of the axis of the second rotation shaft 15 are not away from each other, and hence high assembly accuracy can be achieved.

A spring 46 that energizes the lamp unit 2 in the press fit direction of the intermediate member 34 (in the direction of arrow C in FIG. 9) at all times is fitted to the second pivot section 17. The spring 46 comprises, as shown in FIG. 9 and FIG. 11, an upper plate 47, a front plate 48, and a rear plate 49. At the bottom of the front plate 48 and the rear plate 49, hook portions 50 and 51 formed by folding it back are respectively provided. On the other hand, hook grooves 52 and 53 are respectively provided front and back of the lower face of the second pivot section 17. The hook portions 50 and 51 are engaged with the hook grooves 52 and 53, thereby the spring 46 is fitted to the second pivot section 17. Substantially at the center of the bottom face of the upper plate 47 of the spring 46, a protrusion 54 is formed in a convex curved shape towards the press fit direction of the intermediate member 34 (in the direction of arrow C in FIG. 9) (downward). This protrusion 29 is resiliently abuts against the upper end 55 of the second rotation shaft 15 exposed through the hole 39 in the intermediate member 34 and the inner race of the second bearing 33, thereby the spring 46 can energize the lamp unit 2 in the press fit direction of the intermediate member 34 (in the direction of arrow C in FIG. 9) at all times. In other words, the bending force of the upper plate 47 of the spring 46 acts so as to energize the lamp unit 2 towards the first pivot section 16 side at all times. The spring 46 may not have a structure such that it directly presses the second rotation shaft 15 of the lamp unit 2, but may have a structure such that it presses the second bearing 33 or the intermediate member 34 integral with the second rotation shaft 15.

A positioning groove 56 is provided in the second pivot section 17. The width of the positioning groove 56 is substantially the same as that of the rear plate 49 of the spring 46. The rear plate 49 of the spring 46 is fitted in the positioning groove 56, thereby the spring 46 is attached to the second pivot section 17 with the spring 46 positioned in a predetermined position. As a result, the energizing operation of the spring 46 is reliably performed.

The opposite holding type pivot mechanism according to the embodiment has the above-described configuration. The process of fitting the lamp unit 2 to the frame 3 is explained below, with reference to FIG. 9.

At first, the inner races of the first bearing 32 and the second bearing 33 are press fit and secured, respectively, to the first rotation shaft 14 and the second rotation shaft 15 secured at the lower part and the upper part of the lens holder 8 in the lamp unit 2.

Next, the lamp unit 2 is set to the frame 3 in a direction substantially orthogonal to the vertical axis V—V (in the direction of arrow A in FIG. 9). In other words, the first rotation shaft 14 and the first bearing 32 of the lamp unit 2 are located on the first pivot section 16, and the second rotation shaft 15 and the second bearing 33 of the lamp unit 2 are inserted into the opening 37 in the second pivot section 17 of the frame, in a direction substantially orthogonal to the vertical axis V—V (in the direction of arrow A in FIG. 9). Here, the center of the axis connecting the first rotation shaft 14 and the second rotation shaft 15 in the lamp unit 2, and the center of the axis connecting the hole 35 in the first pivot section 16 and the circular section of the opening 37 in the second pivot section 17 of the frame 3 are made to agree with each other on the vertical axis V—V.

The outer race of the first bearing 32 in the lamp unit 2 is then press fit and secured in the hole 35 in the first pivot section 16 in the direction of vertical axis V—V (in the direction of arrow B in FIG. 9).

Subsequently, while the intermediate member 34 is press fit and secured in the circular section 37 of the opening 37 in the second pivot section 17 of the frame 3 in the direction of vertical axis V—V (in the direction of arrow C in FIG. 9), the outer race of the second bearing 33 in the lamp unit 2 is press fit and secured in the hole 39 in the intermediate member 34, in the direction of vertical axis V—V (in the direction of arrow C in FIG. 9).

Lastly, the spring 46 is attached by press fitting and securing it to the second pivot section 17 in the direction of vertical axis V—V (in the direction of arrow D in FIG. 9). In other words, the hook portions 50 and 51 in the front plate 48 and the rear plate 49 of the spring 46 are engaged with the hook grooves 52 and 53 on the lower face of the second pivot section 17, and at the same time, the rear plate 49 of the spring 46 is fitted in the positioning groove 56 in the second pivot section 17, so that the protrusion 54 in the upper plate 47 of the spring 46 is made to resiliently abut against the upper end 55 of the second rotation shaft 15 exposed through the hole 39 in the intermediate member 34 and the inner race of the second bearing 33. As a result, the process for fitting the lamp unit 2 to the frame 3 is complete.

In this manner, the opposite holding type pivot mechanism according to this embodiment can pivotally support the lamp unit 2 on the frame 3 on opposite sides easily and at a low cost, without using a screw or the like.

In the opposite holding type pivot mechanism according to this embodiment, the concave portion 40 and the convex portion 41 of the detent unit having a wedge structure are respectively provided on the internal surface of the opening 37 in the second pivot section 17 and on the external surface of the intermediate member 34. Therefore, the opposite holding type pivot mechanism according to this embodiment can reliably fix the intermediate member 34 in the opening 37 in the second pivot section 17 without play, by the wedge action of the concave portion 40 and the convex portion 41 of the detent unit, without using a screw or the like.

In the opposite holding type pivot mechanism according to this embodiment, the vertical axis V—V is located on a line connecting the pair of concave portion 40 and convex portion 41 of the detent unit having the wedge structure. As a result, the opposite holding type pivot mechanism according to this embodiment can achieve high assembly accuracy, since the center of the axis of the intermediate member 34 and the center of the axis of the second rotation shaft 15 are not away from each other.

In the opposite holding type pivot mechanism according to this embodiment, the spring 46 that energizes the lamp unit 2 in the press fit direction of the intermediate member 34 (in the direction of arrow C in FIG. 9) at all times is fitted to the second pivot section 17. Therefore, the opposite holding type pivot mechanism according to the embodiment can suppress vertical vibrations (vibrations in the direction of vertical axis V—V) propagating from the car body to the lamp unit 2, by the pressing force of the spring 46, thereby it can be avoided that a force acting so as to let the intermediate member 34 drop out is transmitted from the lamp unit 2. As a result, the opposite holding type pivot mechanism according to the embodiment can sufficiently realize the pivot function by holing at opposite ends, since the excellent press fit and secured condition of the intermediate member 34 can be reliably maintained.

In the opposite holding type pivot mechanism according to the embodiment, the rear plate 49 of the spring 46 is fitted in the positioning groove 56 in the second pivot section 17, thereby the spring 46 is attached to the second pivot section 17, positioned at a predetermined position. As a result, in the opposite holding type pivot mechanism according to the embodiment, the energizing operation of the spring 46 can be reliably carried out.

In the opposite holding type pivot mechanism according to the embodiment, the rotation axis is provided substantially vertically, and the hole 35 in the first pivot section 16 and the first rotation shaft 14 are provided below the frame 3 and the lens holder 8. Therefore, in the opposite holding type pivot mechanism in this embodiment, the first rotation shaft 14 is press fit and secured in the hole 35 in the first pivot section 16 via the first bearing 32, thereby the weight of the lamp unit 2 can be supported by the first pivot section 16 below the frame 3, via the first rotation shaft 14 and the first bearing 32. As a result, in the opposite holding type pivot mechanism in this embodiment, since the weight of the lamp unit 2 is not applied to the second pivot section 17 above the frame 3, stable opposite holding type pivot mechanism can be obtained.

In the opposite holding type pivot mechanism in this embodiment, the lens holder 8, the frame 3, the first pivot section 16, the first rotation shaft 14, the second pivot section 17, the second rotation shaft 15, the intermediate member 34, the first bearing, and the second bearing 33 are made of metal. As a result, the opposite holding type pivot mechanism in this embodiment becomes a pivot structure having high temperature compensating property, since misalignment is unlikely to occur due to a temperature change.

In the opposite holding type pivot mechanism according to the embodiment, a projector-type lamp unit is explained as the lamp unit 2. In the present invention, however, a lamp unit other than the projector-type lamp unit, for example, a lamp unit of a type in which the reflected light from a reflector or a reflector is irradiated to the outside is pivotally supported on opposite sides may be used.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application 2002-062293, filed Mar. 7, 2002, and another parent application (priority not claimed) is Japanese Patent Application 2002-042030, filed Feb. 19, 2002, both of which are incorporated herein by reference in their entirety.

What is claimed is:

1. A vehicle headlamp comprising:
a projector-type lamp unit having a light source, a reflector that reflects light irradiated by the light source, a projection lens that projects light reflected by the reflector in a predetermined light radiation direction, and a lens holder fixed to the reflector for supporting the projection lens, wherein the projector-type lamp unit is capable of being rotated about a rotation axis so as to change the direction of the light irradiated from the projector-type lamp unit;
a frame supporting the projector-type lamp unit;
a pivot mechanism pivotably supporting the projector-type lamp unit rotatably about the rotation axis; and
an inner panel with an opening,
wherein at least the projection lens of the lamp unit is exposed from the opening in the inner panel in the light irradiation direction,
the rotation axis is located opposite to the projection lens, with the inner panel disposed therebetween, and
an external surface exposed from the opening in the inner panel in the light irradiation direction with the rotation of the lamp unit, of the external surface of the lens holder, is formed in a convex circular-arc shape centering on the rotation axis.

2. The vehicle headlamp according to claim 1, wherein an internal surface at the edge of the opening in the inner panel is formed in a concave circular-arc shape having a slightly larger diameter than that of the external surface of the convex circular-arc shape of the lens holder, centering on the rotation axis.

3. The vehicle headlamp according to claim 1, wherein the rotation axis is a single axle, and is provided in the lens holder.

4. The vehicle headlamp according to claim 1, wherein the rotation axis is a single axle provided substantially vertically, and the pivot mechanism comprises an opposite holding type pivot mechanism that pivotally supports the lens holder in the lamp unit rotatably on the frame.

5. The vehicle headlamp according to claim 1, wherein the rotation axis is a single axle provided substantially vertically, and the pivot mechanism comprises an opposite holding type pivot mechanism that pivotally supports the lens holder in the lamp unit rotatably on the frame,
wherein the opposite holding type pivot mechanism includes:
a first pivot that pivotally supports the lens holder on the frame by one of opposite holding parts rotatably about the rotation axis and a first rotation shaft; and
a second pivot that pivotally supports the lens holder on the frame by the other of the opposite holding parts rotatably about the rotation axis, a second rotation shaft, and an intermediate member,
wherein the first pivot, the first rotation shaft, the second pivot, and the second rotation shaft are provided on the lens holder and the frame,
the first pivot is provided with a hole in which the first rotation shaft is mounted rotatably in the direction of the rotation axis,
the second pivot is provided with an opening in which the second rotation shaft is inserted in a direction transverse to the rotation axis, and the intermediate member is press fit and secured in the direction of the rotation axis, and
the intermediate member is provided with a hole in which the second rotation shaft is mounted rotatably in the direction of the rotation axis.

6. The vehicle headlamp according to claim 1, wherein the pivot mechanism comprises a first pivot mechanism and a light axis adjusting mechanism, wherein the rotation axis has two axles intersecting each other, and comprises a first rotation axis that is a rotation axis of the first pivot mechanism that pivotally supports the lamp unit rotatably on the frame, and a second rotation axis that is a rotation axis of the light axis adjusting mechanism that pivotally supports the frame rotatably on the lamp housing.

7. The vehicle headlamp according to claim 1, wherein the pivot mechanism comprises an opposite holding type pivot mechanism and a light axis adjusting mechanism, wherein the rotation axis has two axles, a first rotation axis provided substantially vertically and a second rotation axis provided substantially horizontally, intersecting each other, wherein the first rotation axis is a rotation axis of the opposite holding type pivot mechanism that pivotally supports the lens holder in the lamp unit rotatably on the frame, and the second rotation axis is a rotation axis of the light axis adjusting mechanism that pivotally supports the frame rotatably on the lamp housing.

8. The vehicle headlamp according to claim 1, wherein the pivot mechanism comprises an opposite holding type pivot mechanism and a light axis adjusting mechanism, wherein the rotation axis has two axles, a first rotation axis provided substantially vertically and a second rotation axis provided substantially horizontally, intersecting each other, wherein the first rotation axis is a rotation axis of the opposite holding type pivot mechanism that pivotally supports the lens holder in the lamp unit rotatably on the frame, and the second rotation axis is a rotation axis of the light axis adjusting mechanism that pivotally supports the frame rotatably on the lamp housing,
   wherein the opposite holding type pivot mechanism includes:
     a first pivot that pivotally supports the lens holder on the frame by one of opposite holding parts rotatably about the rotation axis and a first rotation shaft; and
     a second pivot that pivotally supports the lens holder on the frame by the other of the opposite holding parts rotatably about the rotation axis, a second rotation shaft, and an intermediate member,
   wherein the first pivot, the first rotation shaft, the second pivot, and the second rotation shaft are provided on the lens holder and the frame,
   the first pivot is provided with a hole in which the first rotation shaft is mounted rotatably in the direction of the rotation axis;
   the second pivot is provided with an opening in which the second rotation shaft is inserted in a direction transverse to the rotation axis, and the intermediate member is press fit and secured in the direction of the rotation axis; and
   the intermediate member is provided with a hole in which the second rotation shaft is mounted rotatably in the direction of the rotation axis.

9. A vehicle headlamp comprising:
   a projector-type lamp unit having a light source, a reflector that reflects light irradiated by the light source, a projection lens that projects reflected light from the reflector in a predetermined light irradiation direction, and a cylindrical lens holder fixed to the reflector for supporting the whole periphery of the projection lens, wherein the projector-type lamp unit is capable of being rotated about a rotation axis so as to change the direction of the light irradiated from the projector-type lamp unit;
   a frame supporting the projector-type lamp unit;
   a pivot mechanism pivotably supporting the projector-type lame unit rotatably about the rotation axis; and
   an inner panel with an opening,
   wherein a part of the projection lens and the lens holder of the lamp unit is exposed from the opening in the inner panel in the light irradiation direction,
   an external surface of the lens holder is formed in a convex circular-arc shape centering on the rotation axis,
   an internal surface at the edge of the opening in the inner panel is formed in a concave circular-arc shape having a slightly larger diameter than that of the external surface of the convex circular-arc shape of the lens holder, centering on the rotation axis, and
   the rotation axis is a single axle provided substantially vertically, on the side opposite to the projection lens, with the inner panel diposed therebetween, and the Divot mechanism comprising an opposite holding type pivot mechanism that pivotally supports the lens holder in the lamp unit rotatably on the frame.

10. The vehicle headlamp according to claim 9, wherein the opposite holding type pivot mechanism comprises:
   a first pivot that pivotally supports the lens holder on the frame by one of opposite holding parts rotatably about the rotation axis and a first rotation shaft; and
   a second pivot that pivotally supports the lens holder on the frame by the other of the opposite holding parts rotatably about the rotation axis, a second rotation shaft, and an intermediate member,
   wherein the first pivot, the first rotation shaft, the second pivot, and the second rotation shaft are provided on the lens holder and the frame;
   the first pivot is provided with a hole in which the first rotation shaft is mounted rotatably in the direction of the rotation axis,
   the second pivot is provided with an opening in which the second rotation shaft is inserted in a direction transverse to the rotation axis, and the intermediate member is press fit and secured in the direction of the rotation axis, and
   the intermediate member is provided with a hole in which the second rotation shaft is mounted rotatably in the direction of the rotation axis.

11. A vehicle headlamp comprising:
   a projector-type lamp unit having a light source, a reflector that reflects light irradiated by the light source, a projection lens that projects reflected light from the reflector in a predetermined light irradiation direction, and a cylindrical lens holder fixed to the reflector for supporting the whole periphery of the projection lens wherein the projector-type lamp unit is capable of being rotated about a rotation axis so as to change the direction of the light irradiated from the projector-type lamp unit;
   a frame supporting the projector-type lamp unit; and
   an inner panel with an opening,
   wherein a part of the projection lens and the lens holder of the lamp unit is exposed from the opening in the inner panel in the light irradiation direction,
   an external surface of the lens holder is formed in a convex circular-arc shape centering on the rotation axis,
   an internal surface at the edge of the opening in the inner panel is formed in a concave circular-arc shape having a slightly larger diameter than that of the external surface of the convex circular-arc shape of the lens holder, centering on the rotation axis, and the rotation axis includes a first rotation axis provided substantially vertically on the side opposite to the projection lens, with the inner panel disposed therebetween, and a second rotation axis provided substantially horizontally, intersecting each other, wherein the first rotation axis is a rotation axis of an opposite holding type pivot mechanism that pivotally supports the lens holder in the lamp unit rotatably on the frame, and the second rotation axis is a rotation axis of a light axis adjusting mechanism that pivotally supports the frame rotatably on the lamp housing.

12. The vehicle headlamp according to claim 11, wherein the opposite holding type pivot mechanism comprises:

a first pivot that pivotally supports the lens holder on the frame by one of opposite holding parts rotatably about the rotation axis and a first rotation shaft; and a second pivot that pivotally supports the lens holder on the frame by the other of the opposite holding parts rotatably about the rotation axis and a second rotation shaft, and an intermediate member, wherein the first pivot, the first rotation shaft, the second pivot, and the second rotation shaft are provided on the lens holder and the frame, the first pivot is provided with a hole in which the first rotation shaft is mounted rotatably in the direction of the rotation axis, the second pivot is provided with an opening in which the second rotation shaft is inserted in a direction transverse to the rotation axis, and the intermediate member is press fit and secured in the direction of the rotation axis, the intermediate member is provided with a hole in which the second rotation shaft is mounted rotatably in the direction of the rotation axis.

13. An opposite holding type pivot mechanism, for a vehicle headlamp, that pivotally supports a lamp unit of the vehicle headlamp on a frame on opposite sides rotatably about a rotation axis, comprising:

a first pivot that pivotally supports the lamp unit on the frame by one of opposite holding parts rotatably about the rotation axis and a first rotation shaft; and a second pivot that pivotally supports the lamp unit on the frame by the other of the opposite holding parts rotatably about the rotation axis, a second rotation shaft, and an intermediate member, wherein the first pivot, the first rotation shaft, the second pivot, and the second rotation shaft are provided on the lens holder and the frame, the first pivot is provided with a hole in which the first rotation shaft is mounted rotatably in the direction of the rotation axis, the second pivot is provided with an opening in which the second rotation shaft is inserted in a direction transverse to the rotation axis, and the intermediate member is press fit and secured in the direction of the rotation axis, and the intermediate member is provided with a hole in which the second rotation shaft is mounted rotatably in the direction of the rotation axis.

14. The opposite holding type pivot mechanism according to claim 13, further comprising a detent unit, which prevents the intermediate member from rotating about the rotation axis, in each of the second pivot and the intermediate member, wherein the detent units have a wedge structure.

15. The opposite holding type pivot mechanism according to claim 13, further comprising a detent unit, which prevents the intermediate member from rotating about the rotation axis, in each of the second pivot and the intermediate member, wherein the detent units have a wedge structure, and the rotation axis is positioned on a line connecting the detent units.

16. The opposite holding type pivot mechanism according to claim 13, further comprising a spring attached to the second pivot and that energizes the lamp unit in the press fit direction of the intermediate member at all times.

17. The opposite holding type pivot mechanism according to claim 13, further comprising:

a spring that is attached to the second pivot and that energizes the lamp unit in the press fit direction of the intermediate member at all times; and a positioning unit in the second pivot and the spring.

18. The opposite holding type pivot mechanism according to claim 13, wherein the rotation axis is provided substantially vertically, and the first pivot and the first rotation shaft are provided on the lower side of the opposite holding parts, of the lamp unit and the frame.

19. The opposite holding type pivot mechanism according to claim 13, wherein the lens holder, the frame, the first pivot, the first rotation shaft, the second pivot, the second rotation shaft, and the intermediate member are made of metal.

20. An opposite holding type pivot mechanism, for a vehicle headlamp, that pivotally supports a lamp unit of the vehicle headlamp on a metal frame on opposite sides rotatably about a rotation axis, wherein the lamp unit is a projector-type lamp unit and includes a light source; a reflector that reflects light from the light source; a projection lens that projects reflected light from the reflector in a predetermined light irradiation direction; and a metal lens holder fixed to the reflector for supporting the projection lens, the opposite holding type pivot mechanism comprising:

a first pivot made of metal and that pivotally supports the lens holder on the frame by one of opposite holding parts rotatably about the rotation axis, a first rotation shaft made of metal, and a first bearing made of metal; and a second pivot made of metal and that pivotally supports the lens holder on the frame by the other of the opposite holding parts rotatably about the rotation axis, a second rotation shaft made of metal, a second bearing made of metal, and an intermediate member made of metal, wherein the first pivot, the first rotation shaft, the second pivot, and the second rotation shaft are provided on the lens holder and the frame, the first pivot is provided with a hole in which the first rotation shaft is mounted rotatably in the direction of the rotation axis via the first bearing, the second pivot is provided with an opening in which the second rotation shaft is inserted in a direction transverse to the rotation axis and the intermediate member is press fit and secured in the direction of the rotation axis, the intermediate member is provided with a hole in which the second rotation shaft is mounted rotatably in the direction of the rotation axis via the second bearing, each of the second pivot and the intermediate member are provided with a detent unit, which prevents the intermediate member from rotating about the rotation axis, the detent units having a wedge structure, and the rotation axis is positioned on a line connecting the detent units, the second pivot is provided with a spring that energizes the lamp unit in the press fit direction of the intermediate member at all times, the second pivot and the spring are provided with a positioning unit, wherein the rotation axis is provided substantially vertically, and the first pivot and the first rotation shaft are provided on the lower side of the opposite holding parts, of the lamp unit and the frame.

\* \* \* \* \*